Feb. 13, 1945. P. M. G. TOULON 2,369,622
ORIENTATION SYSTEM
Filed June 11, 1941 6 Sheets-Sheet 2

Fig. 3

Inventor:
PIERRE MARIE GABRIEL TOULON
By
Attorney.

Feb. 13, 1945.　　P. M. G. TOULON　　2,369,622
ORIENTATION SYSTEM
Filed June 11, 1941　　6 Sheets-Sheet 3

Inventor:
PIERRE MARIE GABRIEL TOULON
By (signature)
Attorney.

Feb. 13, 1945.  P. M. G. TOULON  2,369,622
ORIENTATION SYSTEM
Filed June 11, 1941  6 Sheets-Sheet 4

Inventor:
PIERRE MARIE GABRIEL TOULON
By Allet Holcombe
Attorney.

Feb. 13, 1945.   P. M. G. TOULON   2,369,622
ORIENTATION SYSTEM
Filed June 11, 1941   6 Sheets-Sheet 5

Inventor:
PIERRE MARIE GABRIEL TOULON
By A. M. Holcombe
Attorney.

UNITED STATES PATENT OFFICE 2,369,622

ORIENTATION SYSTEM

Pierre Marie Gabriel Toulon, Neuilly sur Seine, France; vested in the Alien Property Custodian Application June 11, 1941, Serial No. 397,647
In France May 31, 1938

7 Claims. (Cl. 250—2)

My invention relates to improvements in systems for orienting a distant objective, and more particularly to such systems in which the objective to be orientated is located upon a moving body, such as a ship, which is continually oscillating by rolling and pitching.

An important object of my invention is to provide a novel means for automatically pointing an apparatus in the direction of a distant source of radiant energy. This source may radiate energy such as visible or invisible luminous waves and electromagnetic waves of short wave length.

Preferably in practicing of the invention, a source of invisible luminous rays is used, such as a source of infrared rays.

Another particular object of the invention is to provide a system for automatically and reciprocally maintaining two orientable devices directed at each other, each located upon distant moving bodies subjected to continual movements, such as ships, thereby providing a safe and permanent telecommunication between two ships, in spite of continual oscillations and relative displacements of said ships.

The invention provides also improved means for searching for a corresponding device by sweeping the horizon in order to establish telecommunication therebetween, which thereafter is automatically maintained, at the will of the correspondents.

A further object of the invention is the use of this telecommunication for the transmission of intelligence.

Still another object of the invention is to indicate automatically on board a ship the direction of another ship, and also the approximative distance therebetween.

Other objects and advantageous features will become apparent from the following description and the following appended claims.

The invention comprises means for directionally receiving and focusing a beam of radiant energy projected from a distant source, and for producing an electrical effect by said focused beam depending upon the angular relation between the directional axis of the apparatus to be oriented and the direction of the radiating source and controlling the movement of the orientable apparatus by said electrical effect.

In accordance with a preferred embodiment of the invention, a source of invisible luminous rays, particularly a source of infrared rays is used, the directional receiving of these rays and the focusing of the same being performed by an optical system included in the apparatus to be oriented. This system concentrates the infrared rays on a detecting photo-electric device depending upon the angular relation between the optical axis of the optical system and the direction of the incident infrared rays. The output of the detecting device controls the displacement of the apparatus to be oriented. By this system the detecting device is not influenced when the optical axis of the optical system coincides with the direction of the incident infrared rays, while on the contrary, when said optical axis stands at an angle to the direction of the incident infrared rays, the photoelectric detecting device is influenced and causes movement of the orientable apparatus for returning said optical axis to coincidence with the direction of incident infrared rays, and consequently the orientable apparatus in the desired direction.

By associating a source of infrared rays with the directional optical system of the orientable apparatus a system obtains by which a beam of infrared rays follows the movements of the orientable apparatus and from a distance controls the same.

In this association, because of the directional property of the beam and optical receiving system, an important increase in the range for a given power of the beam, or a decrease of this power for a predetermined range is permitted.

By coupling two systems such as hereinbefore described with the beam of one system being used for automatically controlling the orientation of the other system, it is possible to maintain permanently directed on each other, two orientable devices lying upon distant moving bodies. This mutual control at a distance also permits safe and uninterrupted optical telecommunication between both moving bodies, such as ships.

Further, because of the fact that each of the beams is constantly pointed on corresponding optical receivers a foreign third party may not determine the position of either of the orientable devices.

In this telecommunication system, it is important to prevent disphony, that is, the influence of a very powerful beam on an adjacent optical receiver. This is accomplished by a feature of the invention according to which the respective luminous beams, projected by the orientable devices, are interrupted at different frequencies, particularly by means of rotative obturating discs driven by electric motors, which permit the association of electric filters with each of the optical receivers.

The invention also provides means for stabilizing these frequencies at fixed and predetermined points by providing electric currents determined by said frequencies and intended to control the speed of the respective driving motors, which may be also provided with speed stabilizing means through electric filtering.

For obtaining with certainty a rapid contact between correspondents the invention contemplates that during communication all receivers be adjusted and sensitized at a predetermined frequency $f$, while the luminous beams have a different frequency $f^1$. For contacting a distant station, the calling station reverses these two frequencies, but when contact is established bilateral communication can be maintained.

For searching a correspondent in order to establish telecommunication, improved means for scanning the horizon is provided. According to a preferred embodiment of the invention, a gyroscope operable about a vertical axis maintains each luminous beam in a horizontal plane and permits the scanning of the horizon by means of said beam. Preferably this scanning of the horizon takes place at a great speed and means are provided for decreasing this speed when the correspondent has been contacted.

According to an improved modification, the gyroscope is mounted in the orientable apparatus and has its axis of suspension parallel to the axis of oscillation of the orientable apparatus, so that the gyroscope has only to disclose and to compensate for weak angular displacements. Such angular displacements are translated advantageously into high frequency electric currents by suitable means having no sliding contact.

According to a preferred embodiment of the invention the movement of the orientable apparatus is secured by an electric motor in continuous rotation associated with electromagnetic clutches, which are preferably formed by a differential system. Each clutch serves to connect two coaxial shafts, which are thus rapidly interchangeable. The displacement towards the top and the bottom, also towards the right and the left, with fast and slow speeds is obtained by identical clutches actuating a suitable mechanism.

The optical projector and receiver of each orientable apparatus comprise preferably lenses adapted to form simultaneously water-tight joints. The evacuation of heat produced within a projector is effected by a cap made of a metal having a high heat conductivity, such as aluminium, the cap being provided with internal ribs which aid in conducting away the heat from the projector lamp.

Another feature of the invention resides in the use of means for limiting the output level of the amplifiers associated with photo-electric cells, and to cause said amplifiers to act differentially on the orientation mechanism of the orientable apparatus.

For a clear understanding of the manner by which the objects of the invention are achieved, reference may be had to the accompanying drawings illustrating a preferred embodiment of the invention, it being understood, however, that the specific illustration is for the purpose of disclosure only and places no limitation upon the invention.

Figures 1, 2, 8:
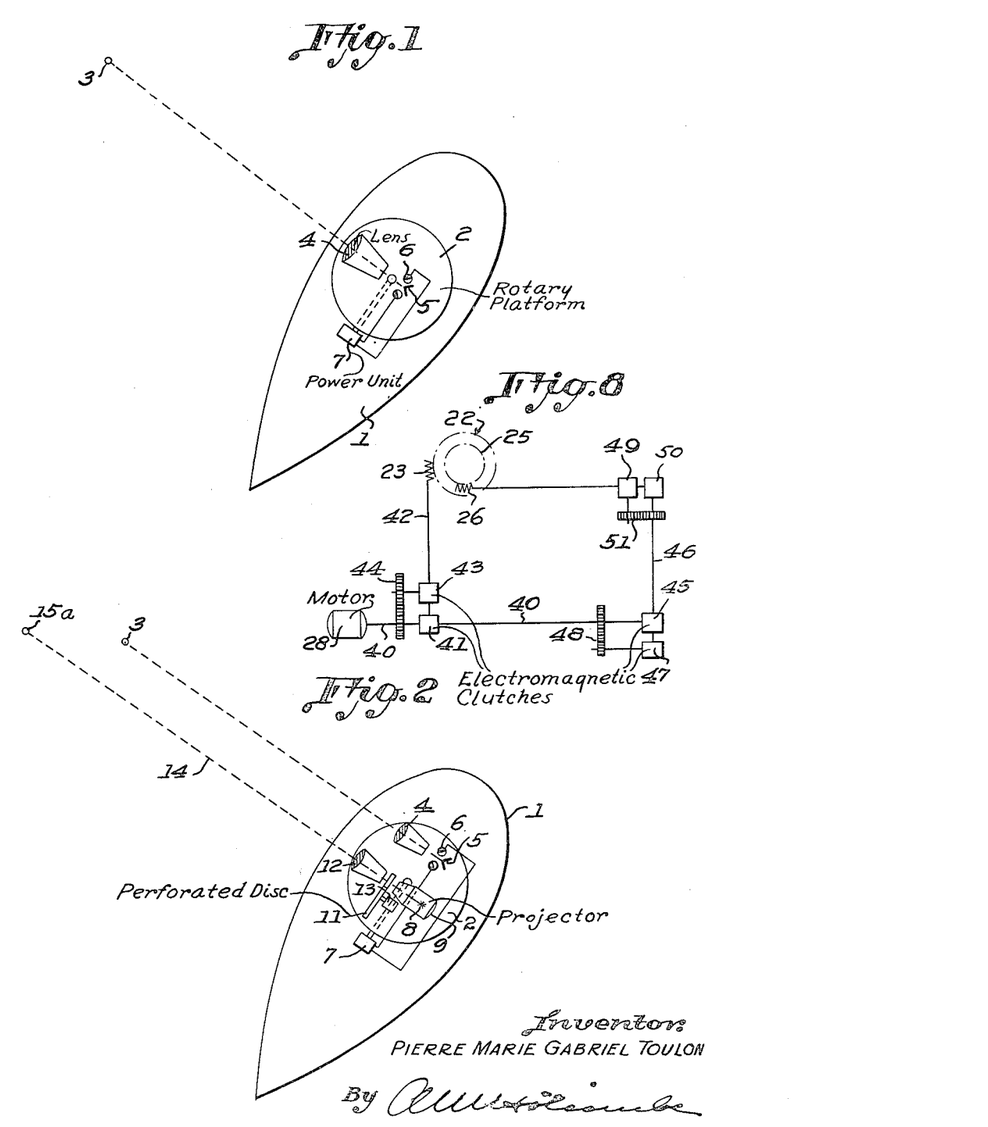
Fig. 1 is a schematic view showing an automatic orientation system in accordance with my invention.
Fig. 2 is a schematic view of a similar system.
Fig. 8 is a schematic view showing the arrangement of clutches acting upon the mechanism of Fig. 4.

Referring to Fig. 1, wherein is shown an embodiment of my invention as applied to a moving body, as a ship 1, the numeral 2 indicates an orientable platform maintained continually and automatically in the direction of a remote source radiating infrared rays 3. The orientable platform 2 is provided with a directional optical device including a lens 4 and a set of mirrors 5 standing at an angle to each other. The lens 4 directs the incident infrared rays on the set of mirrors, which concentrates said rays on a set of photo-electric cells 6. This set of photo-electric cells acts upon a mechanism 7, illustrated here in schematic form, but hereinafter described, the function of which is to move the orientable platform 2. The system is so arranged that, when the ship has no movement, the optical axis of the lens 4 is pointed on the source 3, and the infrared rays, which are concentrated by the mirrors 5, do not impinge on the photo-electric cells 6. On the contrary, when the ship has continual oscillating movements or when the location of the source 3 changes, the optical axis of the lens 4 stands at an angle to the direction of the source 3, and the result is that the infrared rays impinge on one of the photo-electric cells 6. The electrical impulses emitted from the excited cells control the mechanism 7 and the latter returns the orientable platform in the direction of the source 3.

The system above described may be improved by the addition to the orientable frame-work of a radiation source, such as a source of infrared rays, which may be used for automatically orienting another distant orientable apparatus, similar to the apparatus illustrated in Fig. 1. This improvement is illustrated in schematic form in Fig. 2. In the orientable platform or frame-work 2, in addition to the apparatus previously described, a search light or projector is arranged, particularly a projector of infrared rays, the axis of which is parallel to the axis of the optical system 4—5. A luminous source 8 of great intensity and surface which is located in the vicinity of a concave mirror 9 is also included. This mirror reflects luminous rays from the source of light 8 under a wide angle, so that a good luminous efficiency is obtained. A magnified image of the source 8 is formed at a rotating disc 11 which intercepts the beam, and the beam is projected toward infinity by means of a lens 11. On account of the great surface of the image at 11 and the small focal length of the lens 12 it is possible to obtain a very high degree of illumination throughout a large cross-sectional area, and consequently to obtain a beam with a large cone of light, which may be easily picked-up. An electric motor 13 drives the disc 11 at a constant speed, so that the frequency of the interrupted luminous beam is exactly determined. The system thereby is not influenced by daylight or other parasitic light and amplification reception is facilitated. In the described system, it is advantageous to utilize invisible radiations, particularly infrared rays, by the use of suitable filters.

In the improved system, the light projector 8, 9, 12, in fixed relation with the orientable platform or frame-work 2, is subjected to the same displacements as said frame-work, which displacements result from angular digressions between the direction of the source 3 and the optical axis of the receiving device 4—5—6, so that the luminous beam supplied by the projector 8, 9, 12 can relay at a distance these angular deflections for controlling an apparatus, located for example at 15ª, similar to the apparatus illustrated in Fig. 1.

Figure 3:
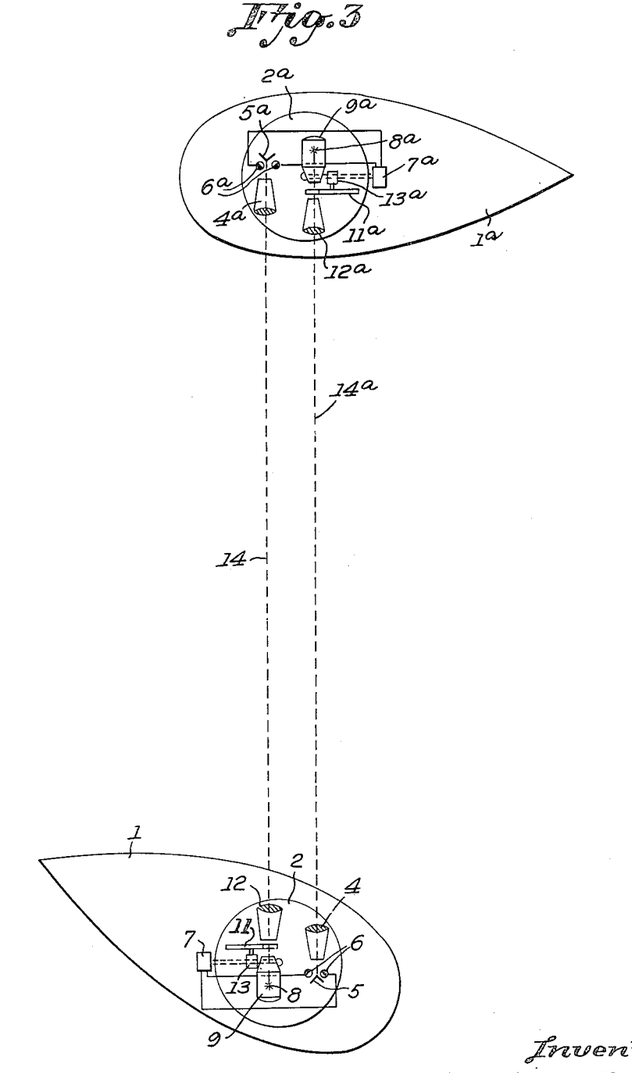
Fig. 3 is a schematic view showing my invention as applied to the orientation of two orientable apparatuses located on distant moving bodies.

By pairing two systems similar to those illustrated in Fig. 2, located upon distant moving bodies, such as ships, it becomes possible to insure a mutual and reciprocable control of two orientable frame-works, and consequently a safe and uninterrupted telecommunication between two ships. Fig. 3 illustrates in schematic form such a pairing system of two orientable frame-works located upon two distant ships 1 and 1ª, which are subjected to the action of the surge and may move about. In this figure, the same reference numbers are used to designate the same elements as above. The first ship 1 supports an orientable frame-work 2 fitted up in the above described manner, said frame-work comprising a light projector including a concave mirror and a lens 12, which from a source of light 8 supplies a luminous parallel beam 14, interrupted by a rotative disc 11. This beam impinges on the optical receiving device included within the orientable frame-work 2ª, which is mounted on board of the ship 1a; thence beam is directed by a lens 4ª on a set of mirrors 5ª standing at an angle to each other, and from these condensed on photo-electric cells 6ª. This arrangement, as above stated, insures the automatic pointing of the orientable frame-work 2ª on the projector 8—9—12 of the orientable frame-work 2 mounted on board of the ship 1, by means of a mechanism 7ª controlled by the photo-electric cells 6ª. In the framework 2ª a projector is arranged which includes a concave mirror 9ª and a lens 12ª, which supplies from a luminous source 8ª a parallel beam 14ª interrupted by the rotative disc 11ª. The optical axis of this projecting device has a fixed position in relation to the optical axis of the receiving device 4ª—5ª, which is maintained in a position directed on the projector 8—12 of the orientable frame-work 2. The beam 14ª therefore is parallel to the beam 14 and directed on the frame-work 2 of the ship 1. There it impinges on the optical receiving device included within the frame-work 2, which is similar to the frame-work 2ª, and includes a lens 4 associated with a concave mirror set 5 for directing and condensing the luminous beam on a set of photo-electric cells 6. This arrangement insures the automatic directing of the orientable frame-work 2 on the projector 9ª—12ª by means of the mechanism 7 controlled by the photo-electric cells 6. Thus each luminous source 8, 8ª maintains directed on it, the orientable frame-work located on the other ship. The orientable frame-works 2 and 2ª of both ships remain continually directed on each other, whatever may be the movements caused by the surge and the relative displacements of both ships.

The above described system permits the establishment of bilateral, regular and uninterrupted telecommunication between the two ships. This telecommunication may be either optical, as above described, or may be performed by means of electromagnetic waves by utilizing a directional wireless beam at each emitting device.

For preventing local optical reaction, that is, the straight action of the projector on the adjacent photo-electric device, it is advantageous to use different frequencies for the luminous beams 14 and 14ª. For instance the beam 14 may be interrupted at a frequency of 1000 cycles per second, and the beam 14ª at a frequency of 1500 cycles per second. Correspondingly the photo-electric cells 6a and 6 included in the receiving devices are sensitive to frequencies of 1000 and 1500 respectively. Each photo-electric cell is associated with an electric filter which prevents the amplifier of one directable frame-work from being influenced by the adjacent projector located in the same frame-work, while at the same time making said amplifier excessively sensitive to the frequency of the frame-work located on the other ship. Also, the interruption of the beam may be used simultaneously in combination with a separate photo-electric cell for supplying an electric current which, after amplification, is intended to stabilize the speed of the electric motors 13, 13ª, respectively, at constant values. This stabilisation may be obtained by means of an electric discharge tube, to the control electrode of which is applied the said electric current, while the anode current of said tube influences the excitation circuit of the motor 13 (13ª) driving the interrupting disc 11 (11ª).

Figure 4:
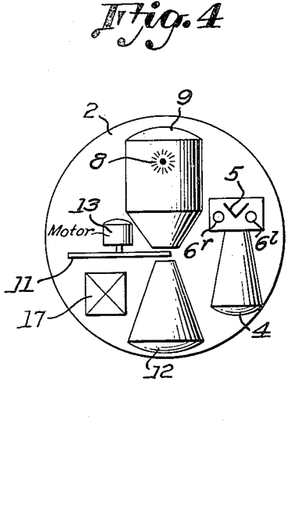
Fig. 4 is a plan view of an embodiment of an orientable apparatus according to the invention.
Figure 5:
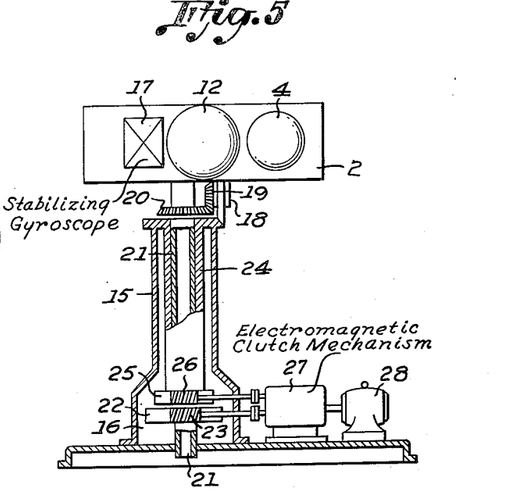
Fig. 5 is an elevation, partly in vertical section, of Fig. 4, showing a control mechanism for the apparatus to be oriented.

According to a preferred embodiment the mechanism 7 (or 7ª) for moving the orientable frame-work is controlled by the set of photo-electric cells 6 or 6ª. The said mechanism is mounted on a dual Cardan suspension and a vertical axis gyroscope having a gravity step-back device. This insures the horizontal stability of the frame-work. The set of photo-electric cells 6 controls only the frame-work displacements in the horizontal plane. This embodiment is illustrated in Figs. 4–5.

Each orientable frame-work 2 or 2ª is mounted upon a pedestal base 15 and rotation and oscillation of this frame-work are obtained by a mechanism 16 arranged in the lower part of the pedestal base 15. The movement of the frame-work in the vertical plane is controlled by a stabilizing gyroscope 17, the arrangement of which will be hereinafter described, and in the horizontal plane by two photo-electric cells 6$^r$ and 6$^1$. The frame-work is supported by a spindle 18 and right angle bevel gears 19, 20. This causes the optical axis of the frame-work 2 to be deviated either towards the top or the bottom. The pinion 20 is connected with a vertical shaft 21 which is controlled by a toothed wheel 22 driven by a worm 23. The support 24 for the shaft 18 is connected with a toothed wheel 25 driven by another worm 26, which causes the rotation of the framework around the vertical axis.

For supplying the amplifiers associated with the photo-electric cells and the projector included within the frame-work 2, electric connections must be used. According to the invention, the vertical shaft 21 is tubular and thus permits all conductors to be passed towards the apparatuses of the frame-work 2. This tubular shaft is water-tight so that the gear case enclosing the wheels and worms 22, 23, 25, 26 may be filled with oil.

The driving of the wheels 22 and 25 is controlled by electromagnetic clutches enclosed within a case 27; these clutches have a great time constant and a progressive effect. All of the parts are driven by an electric motor 28 in continuous rotation.

The motor 28 and the clutches 27 are enclosed within a case, not illustrated, and a suitable water-tight and flexible joint is inserted between the pedestal base 15 and the frame-work 2, so that the whole is protected against spray.

Figure 6:
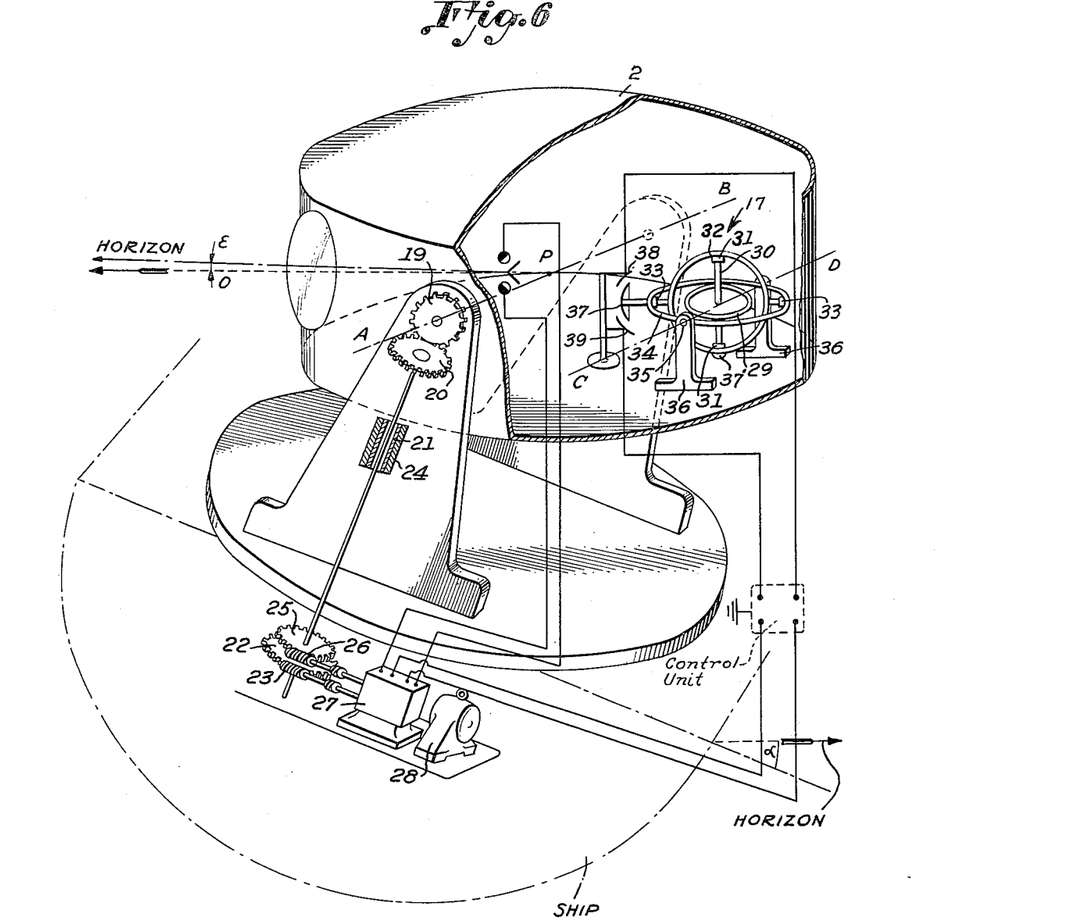
Fig. 6 is a schematic view showing a gyroscope having a vertical axis and arranged for maintaining an orientable apparatus in a horizontal plane.

The stabilisation of the orientable frame-work 2 in the horizontal plane is effected by means of the small size gyroscope 17 in the manner hereinafter described. In Fig. 6, is illustrated in schematic form the arrangement and manner of operation of the gyroscope within the framework 2. This gyroscope comprises a rotatable body 29 journalled at 31, 31 within a rotatable ring 32 which is journaled at 33, 33 within another ring 34. The latter rotates at 35 within a pedestal base 36 fastened to the frame-work 2. The spindle 30 is turned in vertical plane by a heavy mass 37' and the ring 34 remains permanently in the horizontal position. The position of the pedestal base 36 within the frame-work 2 is so arranged that the suspension horizontal axis AB of the frame-work 2 is parallel to the suspension horizontal axis CD of the gyroscope. Thus the optical axis of the frame-work 2 is parallel to the axis OP of the gyroscope, that is perpendicular to the common direction of the respective Cardan suspension axis of the framework 2 and gyroscope. Owing to this arrangement, it is no longer required to stabilize the frame-work 2 in two directions but only in one direction to maintain the horizontal position of the luminous beam. When under the effect of the ship oscillations, the frame-work 2 and consequently the pedestal base 36 of the gyroscope, begin to list over the horizontally maintained ring 34, the list is translated immediately as previously described, and the orientable frame-work is operated for returning the optical axis to a horizontal plane. The gyroscope need only to disclose small angular deflections of the frame-work 2 in relation to the stabilizing horizontal position of the optical axis. For example the angular deviation of the gyroscope may be only one or two degrees, while the oscillation amplitude of the ship may reach thirty degrees.

According to a preferred embodiment the angular position of the small size gyroscope in relation to the frame-work 2 is determined by means of high frequency currents, in order to eliminate any sliding friction which would occur, for instance under the action, of a brush rubbing on a contact piece. The amplitude is determined proportionally so that in the desired clutch a current is obtained which corresponds to the angular deviation between the true and momentary position of the frame-work.

Figure 7:
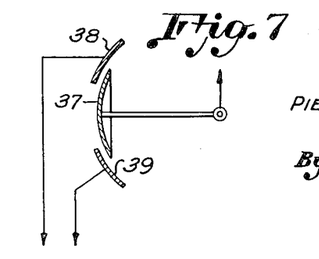
Fig. 7 is a schematic view illustrating an electrostatic control of the orientable apparatus by means of a gyroscope.

This high frequency current control is illustrated in schematic form in Fig. 7. The ring 34 of the gyroscope 17 is connected in any suitable manner with an electrode 37 facing two electrodes 38 and 39 fastened to the frame-work 2. The variable capacity between electrodes 37 and 38 forms a part of an oscillating circuit not illustrated; the variable capacity between electrodes 37 and 39 form a part of another oscillating circuit not illustrated. The resonant frequencies of these circuits, as well as the intensities of respective currents flowing through said circuits, are varied necessarily in accordance with the relative position of the electrodes 37, 38, 39 and in accordance with the relative direction of the optical axis of the frame-work 2 and the horizontal axis of suspension of the gyroscope. After amplification these currents act upon the corresponding clutches 27 which control the rotation of the worm 23 in the desired direction. This system, being highly sensitive and rapid in operation, compensates automatically for the oscillations due to rolling and pitching as well as the acceleration of the ship.

In the telecommunication system above described, the initial contacting of a correspondent is difficult since the optical axis of both frameworks, which are moving in space and independent, must be brought in coincidence. To facilitate this initial contacting, it is contemplated that, during scanning, the orientable frame-work is moved continuously in the horizontal plane until it receives a luminous impulse from the correspondent. At this instant the orientable frame-work is brought automatically under the control of the received luminous beam, by the means hereinbefore described. The initial contacting of the correspondent is effected by momentarily arresting the horizontal scanning and projecting the beam in the direction where the correspondent is most likely to be. If the latter is responding, an automatic mechanism releases the control which maintains both frame-works directed on each other. In order that the contacting of a correspondent may be rapid, a rapid alternating movement is imparted to the orientable frame-work until such time as the beam of the correspondent has been received. At this instant the frame-work is subjected to slow displacements which permit control. In other words, the horizontal scanning changes from high speed during the scanning period to adjustments at slow speed during the control period.

This foregoing is accomplished by a particular arrangement of the clutches enclosed in the case 27, which is illustrated in schematic form in Fig. 8. The motor 28 drives a shaft 40 which may be coupled with another shaft 42 through the clutch 41 in order to direct the orientable framework upwards by means of the transmission gear 22—23. When the clutch 43 is operated, the shaft 42 rotates in the opposite direction, due to the gearing 44, and directs the frame-work downwards.

A clutch 45 causes a shaft 46 to rotate slowly, while another clutch through gears 48 imparts to said shaft 46 a rapid rotation. Finally clutches 49 and 50 through gears 51 cause the tubular shaft 24 of the mechanism 16 (Fig. 5) to rotate clockwise or counter-clockwise. The orientable frame-work 2 follows these displacements by means of the transmission gear 25—26. The directing of the frame-work either to the right or to the left may be thus effected rapidly or slowly according to the clutches 47 or 45.

The clutches 41 and 43 are controlled during scanning by the gyroscope 17, through the device shown in Fig. 7. Clutch 47 causes the shaft 46 to rotate rapidly, and clutches 49 and 50 control the alternative scanning of the horizon by the optical axis of the frame-work according to the desired angle. If, in the course of rapid scanning, either of cells $6^r$, $6^l$ is influenced by a suitable modulated luminous beam, the high speed clutch 47 is replaced automatically by the slow speed clutch 45. Clutches 49 and 50 are controlled by photo-electric cells $6^r$ and $6^l$ and cause the frame-work 2 to be directed on the received beam. Simultaneously a relay turns on the source 8 and starts the small motor 13 which modulates the light beam of the source 8.

Figure 9:
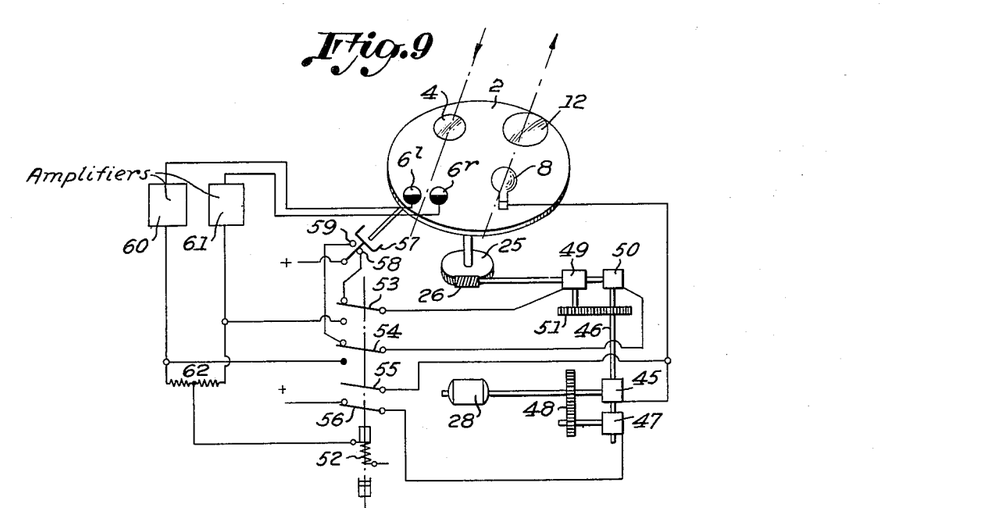
Fig. 9 is a schematic view showing the circuit arrangement for the control of the orientable apparatus.

The Fig. 9 illustrates in schematic form this arrangement. During the scanning period, a relay 52 controlled by photo-electric cells $6^r$ and $6^l$, is not excited, and its movable contacts 53, 54, 55, 56 are in the illustrated position. The motor 28 is rotating and the high speed clutch is supplied with current by contact 56, so that the frame-work 2 is rotating rapidly, for example in a clockwise direction. After a time, the frame-work 2 causes a fork 57 to rock, which instead of making contact with fixed contact piece 58, as illustrated in the drawings, passes over contact 59. Clutch 49 is no longer excited; but clutch 50 starts in operation, so that the orientable frame-work begins to rotate rapidly in a counter-clockwise direction. The frame-work thus performs the horizontal scanning above mentioned.

As soon as either of cells $6^r$ or $6^l$ receives through the lens 4 the suitably modulated radiation from the other ship, amplifiers 60 and 61 through a voltage divider 62 energize the relay 52 which attracts its armature. This results in the movable contact 55 closing the electrical circuit to the clutch 45, while the circuit of the clutch 47 is opened by the movable contact 56, which energizes the luminous source. On the other hand amplifiers 60 and 61 through movable contacts 53 and 54 energize the clutches 49 and 50, which maintain automatically the orientable frame-work directed on the luminous beam of the correspondent. The relay has a time limit release, so that it is not influenced by short interruptions of its exciting current when the incident beam changes from one photoelectric cell to the other. But, if for any reason, the communication has been interrupted, the system returns automatically to the scanning state.

In this system direct action of the projector on the adjacent photoelectric cells, is prevented by use of different frequencies for the luminous beams, as already mentioned. During the scanning period photo-electric cells $6^r$ and $6^l$ are responsive for instance, to a frequency of 1500 cycles per second, while they are not responsive to a frequency of 1000 cycles per second, that which the rotative disc 11 imparts to the beam of light of the source 8. Predetermined signals may be arranged to contact a corresponding ship.

After having picked-up the beam of a correspondent, which is also in scanning condition, the operator changes the frequency of the projected luminous beam and also the frequency of electric filters associated with output circuits of photoelectric cells. During the contacting period, the photo-electric cell device is responsive for instance to the frequency of 1000 cycles per second, while the luminous beam is interrupted at the frequency of 1500 cycles per second.

Once telecommunication is established, the contacting frame-work maintains its new frequencies, namely, emission at 1500 cycles per second and receiving at 1000 cycles per second, while the contacted frame-work maintains frequencies corresponding to the scanning period, namely, emission at 1000 cycles per second and reception at 1500 cycles per second.

Interference is thereby avoided between corresponding luminous beams, because communication between the two ships is always started by either of the correspondents, and by choosing a different frequency, communication may be maintained without fear of interference.

The range of telecommunication may vary over a wide range because the strength of the beam received varies not only with distance but also in accordance with the density of the atmosphere; that is, the atmosphere may be clear air or dense fog. Accordingly the intensity of the signal received may vary from 1 to 100,000 and the receiving instrument must be adjustable to allow for this variation. Furthermore, on board ship there is apt to be a wide variation in the voltage supplied to the instruments and the gain of the amplifier may vary greatly.

In the present invention these drawbacks are overcome in the manner herein described. Accordingly, each amplification channel is provided with an automatic gain control which automatically adjusts the output level of the signal to a suitable volume. Furthermore, electric filter means are provided to pass only the desired characteristic frequencies with the result that the background noises are kept below a premissible relative value.

Figure 10:
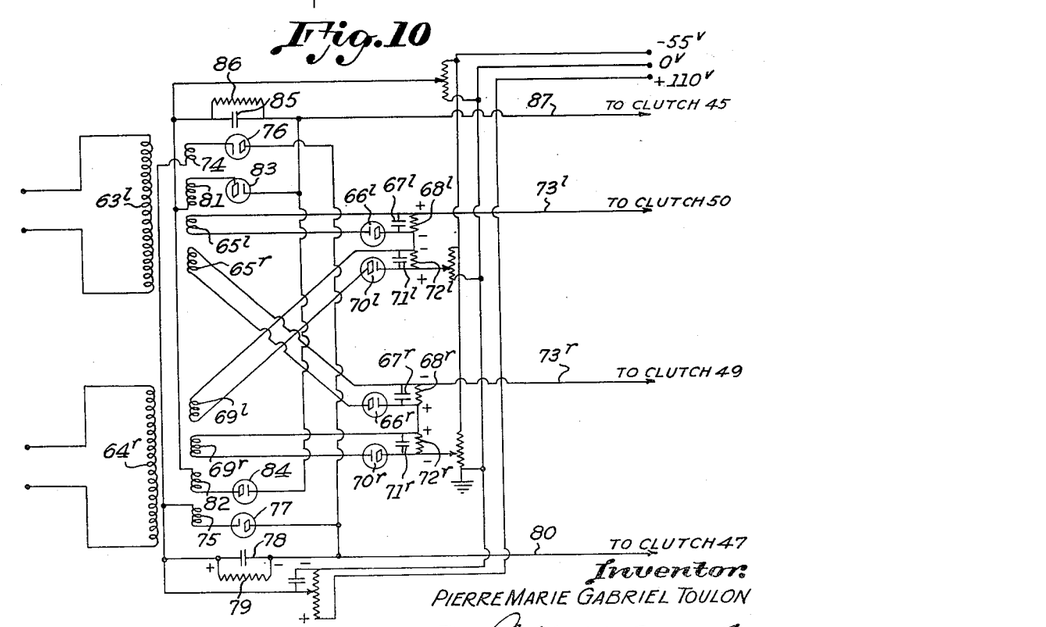
Fig. 10 is a schematic view illustrating a modified circuit arrangement for the control of the clutches.

Moreover in order that the orientable frame-work may be truly responsive either in a clockwise or counter-clockwise direction the invention contemplates the use of a differential detector device between the amplifier output and electro-magnetic clutches 27, which device is hereinafter described and shown in Fig. 10. Windings $63^l$ and $64^r$ are the amplifier output windings. With the winding $63^l$ are coupled two windings $65^l$ and $65^r$ which are connected to two circuits one a rectifier $66^l$ associated with a condenser $67^l$ and a resistance $68^l$, and the other a rectifier $66^r$ associated with a condenser $67^r$ and a resistance $68^r$. Both rectifiers $66^l$ and $66^r$ are arranged in reversed connection, in such a way that the continuous voltages across resistances $68^l$ and $68^r$ have reversed polarity as indicated in Fig. 10. Likewise with the winding $64^r$ are coupled two windings $69^l$ and $69^r$ which are connected to two cricuits one a rectifier $70^l$ associated with a condenser $71^l$ and a resistance $72^l$, the other a rectifier $70^r$ associated with a condenser $71^r$ and a resistance $72^r$. Both rectifiers $70^l$ and $70^r$ are arranged in reversed connection, so that the continuous voltages across resistances $72^l$ and $72^r$ are reversed in polarity as indicated in Fig. 10. The connection $73^l$ supplies current to the clutch 50, of Fig. 9, which causes the orientable frame-work 2 to be moved counter-clockwise, and the connection 73ʳ supplies current to the clutch 49 of Fig. 9, which causes the orientable framework to be moved clockwise. As a result an electric impulse from the photo-electric cell 6¹ will cause a voltage drop of value A across the resistance 68¹ and will also cause a voltage drop across the resistance 68ʳ. Likewise an electric impulse from the photo-electric cell 6ʳ causes a voltage drop of a value B across the resistance 72ʳ and a similar voltage drop across the resistance 72¹. The connection 73¹ thus applies to the clutch 50 a differential voltage of value A—B, and the connection 73ʳ applies to the clutch 49 a differential voltage of value B—A. For example A may equal 10 volts and B may equal 1 volt when the two instruments are at a great distance from each other. Thus when photo-electric cell 6ʳ is excited by the luminous beam, if clutches 49 and 50 are set to operate at two volts with the voltage values of A and B of 10 and 1 volts respectively, clutch 50 will operate whereas clutch 49 will not. In this way the instrument is operable. Under other operating conditions when the two instruments are at close proximity A may equal 10,000 and B may equal 1,000 and if no differential device is provided, both of clutches 49 and 50 will be energized and the instrument will be rendered unoperable. However, differential devices are provided with the result that the voltage values are reduced to an extent that accurate working voltages are impressed upon the clutches.

This differential detecting device for exciting the clutches 49 and 50 is associated with the respective exciting circuits of the slow speed clutch 45 and the high speed clutch 47 so as to obtain the working of these clutches as for the right-hand displacement both for clockwise and counter-clockwise displacement of the mechanism 16 of Fig. 5. In this purpose windings 63¹ and 64ʳ supply current, through respective windings 74 and 75, two rectifiers 76 and 77 in parallel connection in a circuit including a condenser 78 and a resistance 79, which circuit delivers, through the connection 80, the exciting current necessary to the high speed clutch 47. Likewise the windings 63¹ and 64ʳ supply current simultaneously, through respective windings 81 and 82, two rectifiers 83 and 84 in parallel connection in a circuit including a condenser 85 and a resistance 86, which circuit delivers, through the connection 87, the exciting current necessary for the slow speed clutch 45.

Figure 11:
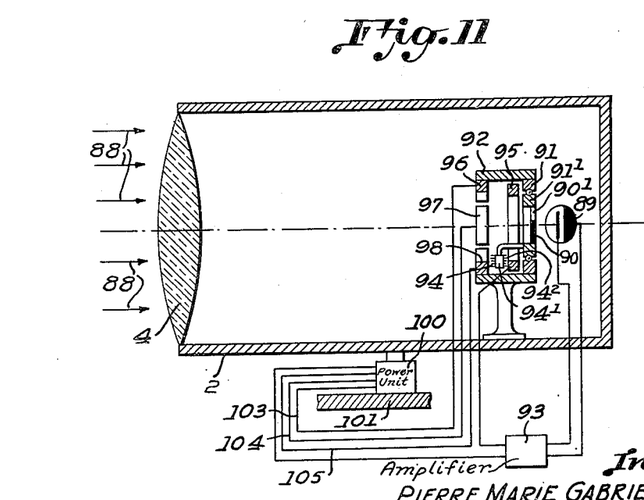
Fig. 11 is a vertical sectional view showing an embodiment of an orientable apparatus with a single photo-electric cell.
Figure 12:
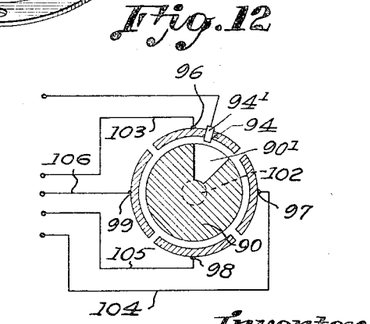
Fig. 12 is a view showing the obturating disc associated with a distributor included in the embodiment of Fig. 11.

Instead of two photo-electric cells enclosed in a receiving device for controlling clockwise and counter-clockwise movement of the orientable frame-work it is possible to utilize only one photo-electric cell associated with a rotative obturating disc and a distributor. This modification is illustrated in Figs. 11 and 12. The orientable frame-work having any suitable form, is provided with an aperture in which is mounted the lens 4 for directing and condensing the incident beam 88 on a single photo-electric cell 89, through a rotative obturating disc 90. Disk 90 is rotated by an electric motor not shown and is mounted upon a ballbearing assembly 91—91'. The inner race is driven by the electric motor through a belt not shown and the external race is mounted on a support 92. Disk 90 is solid except for a sector shaped slot or perforated part 90¹. The photo-electric cell 89 faces disk 90 and has directed upon it the infrared rays passing through the sector aperture 90¹. This aperture, and the surface of the photo-electric cell are arranged in such a way that said cell receives the infrared rays which passed through the aperture 90¹, whatever the position of the latter may be. The cell 89 is connected to an amplifier 93, the input of which is connected to a rotative brush 94 fastened on a support 94¹ integral with the rotative disc 90 and driven simultaneously therewith. The current is applied to the brush 94 through a fixed ring 95 in contact with another brush 94² fastened and electrically connected to the support 94¹. The brush 94 bears upon fixed sectors 96, 97, 98 and 99 connected with a mechanism 100, which may be the mechanism 16 with clutches 27 and motor 28 illustrated in Fig. 5. This instrument is mounted through the mechanism 100 upon the ship indicated at 101.

Normally, when the axis of the lens 4 coincides with the direction of incident infrared rays, the image of the distant source is formed on the massive central part of the rotative disc 90, namely, the part 102 illustrated in dotted line in Fig. 12. In this condition no light impinges on the photo-electric cell 89 and no current is applied to the mechanism 100; the frame-work 2 remains in the desired position.

If, in consequence of any exterior impulse, such as the wind effect and the oscillations being transferred by friction to the mechanism 100, the frame-work 2 is rotating, or if the remote source is displaced, the image is no longer formed exactly at 102, but away from this circle. At the instant when the sector 90¹ passes in front of the luminous spot formed by the image, the photo-electric cell 89 delivers a current which, after amplification, is applied to the mechanism 100 through either of connections 103, 104, 105 and 106, in accordance with the position of the luminous spot on the obturating disc 90. Thus, for instance, if the frame-work is directed too high in relation to the direction of incident infrared rays 88, the image of the distant luminous source is produced underneath the circle 102, and when the aperture 90¹ is below, the photo-electric cell 89 furnishes a current. At this instant the brush 94 bears on the fixed sector 98 and this current is applied to the mechanism 100 through the connection 105, which causes the axis of the optical system to turn towards the bottom and the luminous spot to move towards the circle 102. When the luminous spot has reached this circle 102, the current is interrupted and, at this instant, the frame-work is accurately pointed. If, on the contrary, the framework is pointed too low in relation to the direction of incident infrared rays 88, the image of the remote source produced by the lens 4 is over the circle 102, and when the sector aperture 90¹ passes at the top, the photo-electric cell delivers a current. At this instant the brush 94 bears on the fixed sector 96, and this current is applied through the connection 103, to the mechanism 100, which moves the frame-work 2 until the luminous spot falls again on the circle 102. Similarly, if the direction of infrared rays is to the left or right in relation to the optical axis of the lens 4 the photo-electric cell delivers a current through either of sectors 97, 99, and either one of connections 104 or 106, to the mechanism 100.

Thus the system maintains the axis of the optical device in coincidence with the direction of incident infrared rays and consequently the frame-work 2 is continuously pointed on the distant luminous source.

Instead of using a gyroscope for maintaining the stabilization of the frame-work in a horizontal plane, it is possible to suspend the orientable frame-work by means of three axes perpendicular to each other, and arranged in such a manner that the common intersection point forms the center of suspension. The center of suspension may be made to coincide with the center of gravity, so that the orientable framework is in equilibrium and not subject to ship acceleration. In this condition the pointable frame-work is at all times horizontally maintained and photo-electric cells control the orientation in the manner above described and illustrated in Fig. 5.

Figure 13:
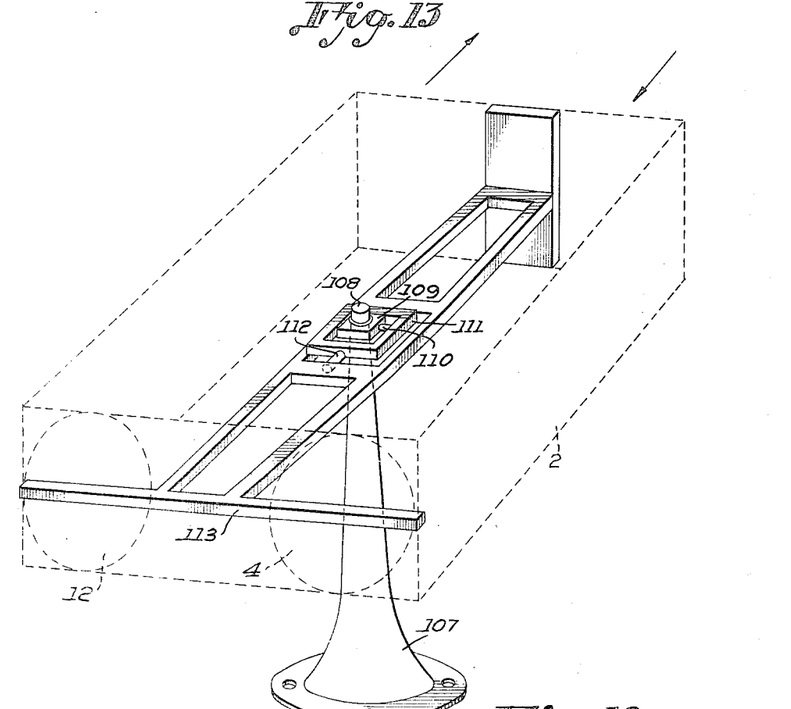
Fig. 13 is a view showing a three perpendicular axis suspension by which the orientable apparatus may be suspended in constant equilibrium.
Figure 14:
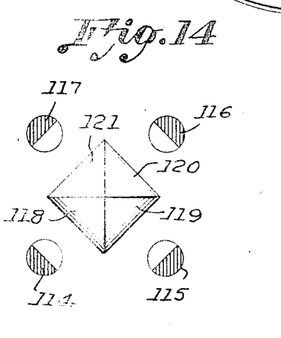
Fig. 14 is a view showing the arrangement of four photo-electric cells for the embodiment of Fig. 13.

An example of such a suspension or triple Cardan suspension is shown in Fig. 13. The ship supports a pedestal base 107 terminated by a vertical spindle 108 around which a metallic mass 109 is pivoting in a horizontal plane. This mass has a horizontal axis 110 which supports a frame 111 pivoting round said axis. This frame 111 has a horizontal axis 112 which supports a framework 113 pivoting round said axis 112. The axes of pivots 108, 110 and 112 are perpendicular to each other, and the frame-work 113 is for instance similar to the frame-work 2 of Fig. 4. By suitable balancing, the center of gravity of the frame-work 113 is brought to pass through the intersection point of axes 108, 110 and 112, so that the whole remains in equilibrium. This balancing may be obtained by a judicious arrangement of the projecting optical system and adjacent receiving optical system. Lenses of both optical systems are indicated by 4 and 12. In this embodiment, four photo-electric cells 114, 115, 116, 117 are conjugated to four mirrors 118, 119, 120 and 121, as illustrated in Fig. 14, in order to maintain the control of the frame-work 113 in all directions.

In the described embodiments, one may take advantage of the automatic directing of the frame-work on a moving distant projector, for determining at all times, the position and particularly the azimuth of this projector. For this purpose, there is coupled to the frame-work, either electrically or mechanically, an indicating instrument, the moving element of which, as for example index or a luminous spot, will follow in front of a divided dial the movements of the frame-work and will indicate the position of same.

While various embodiments of my invention have been disclosed as examples, it is understood that various modifications, within the conception of those skilled in the art, are possible without departing from the spirit of my invention or the scope of the claims.

What I claim is:

1. The combination with a transmitter of a concentrated beam of radiant energy periodically interrupted, of a distantly located apparatus for receiving and focusing said beam, photo-electric means in said apparatus responsive to the radiant energy of said beam and arranged to produce electrical effects in accordance with the angular relation between the directional axis of said apparatus and the direction of said beam, said electrical effects causing said distantly located apparatus to be orientated on said beam.

2. In a system of communication, two distantly located stations, each of said stations comprising a transmitter arranged to transmit a concentrated beam of radiant energy periodically interrupted at a predetermined frequency, singular means for receiving and focusing a beam from a corresponding station, photo-electric means responsive to the radiant energy of a beam and arranged to produce electrical effects in accordance with the angular relation between the directional axis of a receiving station and the direction of a beam from a corresponding station, said electrical effects causing said stations to be mutually orientated on corresponding beams.

3. A system for the mutual orientation of two orientable devices distantly located, each device comprising an invisible luminous beam projector and an optical receiver having a parallel optical axis, means for interrupting the projected beam at a predetermined frequency, different in each device, a plurality of photo-electric cells associated with the optical receiver and selectively responsive to said interrupted beam and to any angular deflection between the direction of said beam and the optical axis of the receiver, and means controlled by the photo-electric cells and actuating the orientable devices for constantly maintaining the receiving optical axis of each orientable device in the direction of the beam projected from the other orientable device.

4. A system for the mutual orientation of two distant orientable devices, each device comprising an invisible luminous beam projector and an optical receiver having parallel optical axis, means for interrupting the projected beam at a predetermined frequency different in each orientable device, a plurality of photo-electric cells associated with the optical receiver for selectively responding to said interrupted beam and to any angular deflection between the direction of said beam and the optical axis of the receiver, means for stabilizing each of the orientable devices in a horizontal plane, and means controlled by the photo-electric cells for moving at variable speeds the orientable devices in the horizontal plane and for directing the optical axis of each orientable device in the direction of the beam projected from the other orientable device.

5. A system for the mutual orientation of two orientable devices distantly located, each device comprising a projector for projecting a beam of invisible luminous rays, means for interrupting said beam at a predetermined frequency different in each device, an optical receiver having an optical axis parallel to the optical axis of the projector and including a lens associated with a pair of mirrors angularly disposed, a pair of photo-electric cells associated with the pair of mirrors selectively responsive to said interrupted beam and to the angular deflection between the direction of said beam and the optical axis of the receiver, a gyroscope operable about a vertical axis and having an axis of suspension parallel to the axis of oscillation of the orientable device, a means including two perpendicular shafts for moving said orientable device in vertical and horizontal planes, an electric motor in continuous rotation driving said means, electromagnetic clutches controlled by said gyroscope and arranged for actuating said mechanism and moving the orientable device in a vertical plane, other electromagnetic clutches controlled by said photo-electric cells arranged for actuating said mechanism and moving said orientable apparatus in a horizontal plane, whereby the optical axis of the receiver of each orientable apparatus is maintained in the direction of the beam projected from the other apparatus.

6. A system for constantly orienting an orientable device distantly located in the direction of a source of a beam of visible luminous rays, comprising within the orientable apparatus of an optical device for receiving and focusing a beam from said source, a photo-electric cell, a rotative obturating disc between said optical device and photo-electric cell for influencing said photo-electric cell in accordance with the angular relation between the direction of said optical device and said beam, a distributor associated with the obturating disc, and means controlled by said distributor and photo-electric cell for moving the orientable apparatus.

7. A system for constantly orienting an orientable device distantly located in the direction of a source of an invisible luminous beam, comprising suspending said orientable device in such a manner that the center of suspension coincides with the center of gravity of said apparatus to be oriented, an optical receiver including a lens associated with a plurality of mirrors in pyramidal arrangement, a plurality of photo-electric cells associated with said mirrors selectively responsive to the beam from said source and to the angular deflection between the direction of said beam and the optical axis of the receiver, and means controlled by said photo-electric cells for constantly maintaining the optical axis of the receiver in the direction of the beam projected by said source.

PIERRE MARIE GABRIEL TOULON.